(12) United States Patent
Man (10) Patent No.: US 6,558,498 B1
(45) Date of Patent: May 6, 2003

(54) PROCESS OF FABRICATING AN INFLATABLE ITEM

(75) Inventor: Nau Siu Man, Dragon Terrace (HK)

(73) Assignee: Namma Manufacturing Company, Ltd. (HK)

( * ) Notice: Subject to any disclaimer, the term of this patent is extended or adjusted under 35 U.S.C. 154(b) by 0 days.

(21) Appl. No.: 09/527,294

(22) Filed: Mar. 17, 2000

(51) Int. Cl.$^7$ ................................................ B32B 31/20
(52) U.S. Cl. ........................ 156/245; 156/245; 156/292; 156/308.4; 264/319; 264/331.11
(58) Field of Search ................................ 156/73.5, 145, 156/242, 292, 308.2, 308.4, 311, 73.1, 580.1, 580.2; 264/222, 299, 319, 327, 330, 331.11; 446/226; 249/55; 425/403, DIG. 57; 600/38

(56) References Cited

U.S. PATENT DOCUMENTS

| | | | | |
|---|---|---|---|---|
| 4,159,220 A | * | 6/1979 | Bosche et al. | 156/358 |
| 5,316,605 A | * | 5/1994 | Rakonjac et al. | 156/145 |
| 6,309,487 B1 | * | 10/2001 | Herrin et al. | 156/290 |

\* cited by examiner

Primary Examiner—Michael W. Ball
Assistant Examiner—John T. Haran
(74) Attorney, Agent, or Firm—Greensfelder, Hemker & Gale, P.C.

(57) ABSTRACT

A process of fabricating an inflatable item includes providing first and second three-dimensional molds, and placing first and second flexible polymer sheets over respective ones of the first and second molds. The polymer sheets are heated until the sheets conformally coat the respective molds. The heated polymer sheets are cooled such that the sheets retain the three-dimensional shapes of the respective molds. Peripheral edges of the first polymer sheet and the second polymer sheet are welded to each other to form a sealed flexible shell having an interior space that can be filled with fluid to inflate the shell such that the shell forms a three-dimensional shape. The sheets may be welded by placing the cooled polymer sheets on respective plates of a welding machine, and moving the plates toward each other until the peripheral edges of the cooled polymer sheets touch each other. The plates of the welding machine are disposed on horizontal shafts, and the shafts are moved such that the plates move horizontally toward each other. Preferably, the three-dimensional shape of the shell is the shape of a human female body or torso, and includes three-dimensional features such as breasts, a navel, a collarbone, shoulder blades, a lumbar curve, and buttocks.

7 Claims, 8 Drawing Sheets

PROCESS OF FABRICATING AN INFLATABLE ITEM

FIELD OF THE INVENTION

The present invention relates generally to a process of fabricating inflatable soft vinyl products having irregular contours and extremities. In particular, the present invention is applicable to the fabrication of a life-like inflatable doll that resembles a human figure, and that includes realistic three-dimensional anatomical features of an actual human figure.

BACKGROUND OF THE INVENTION

There are many inflatable polyvinyl chloride (PVC) products available on the market today. Generally, these products assume a substantially flat, two-dimensional shape when deflated, and a three-dimensional shape when inflated. The inflated product is often one that provides buoyancy in the water, and has a nondescript geometric shape. However, novelty inflatable products that assume a recognizable shape when inflated are also available. Some of these novelty products are animal-shaped, and are sold as toys for children. Others are shaped like mannequins, either for use in displaying items of clothing, or for sale as an adult novelty.

Figure 1:
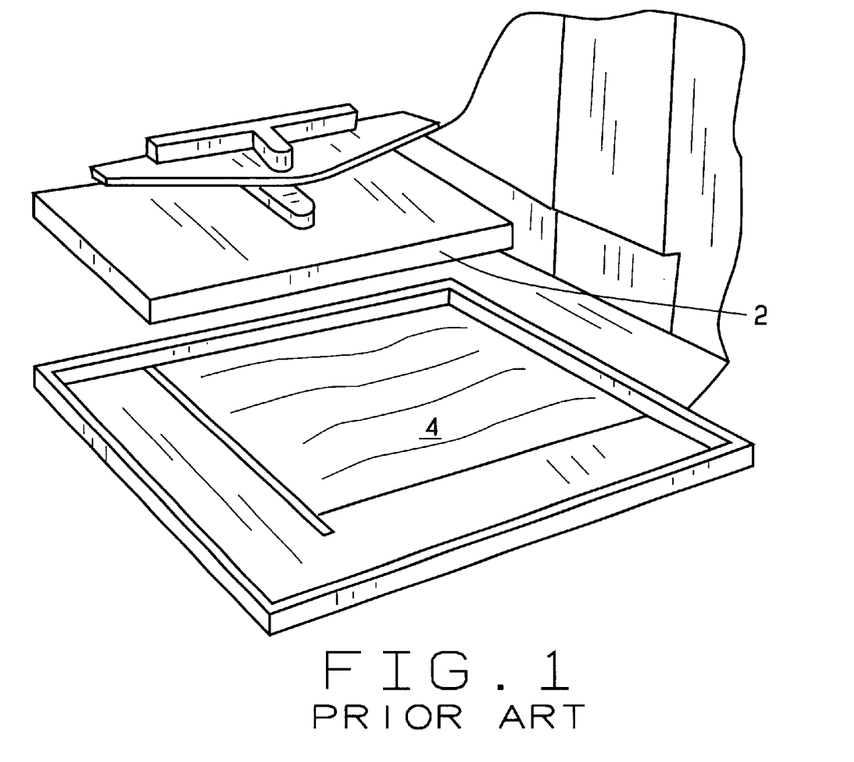
FIG. 1 illustrates a conventional process of fabricating an inflatable PVC product using a vertically-mounted welding machine.
Figure 2:
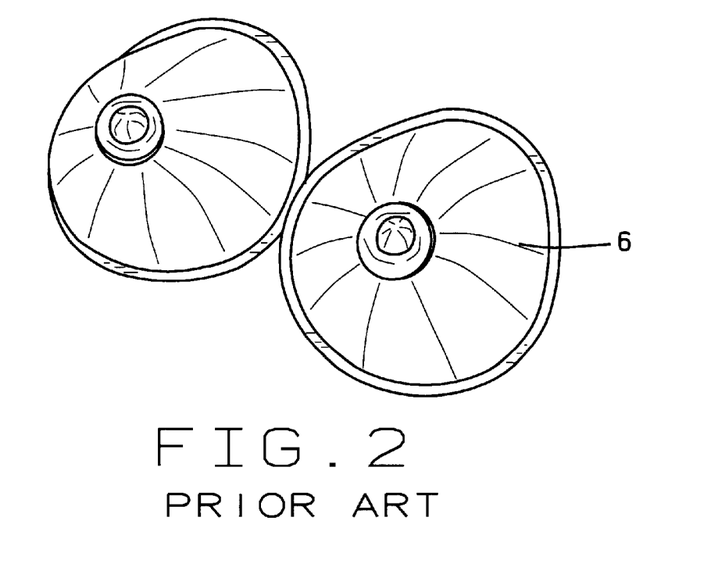
FIGS. 2–7 show a conventional process for adding breast pieces to the torso portion of an inflatable mannequin, showing the seams formed at the base of the breast pieces.
Figure 3:
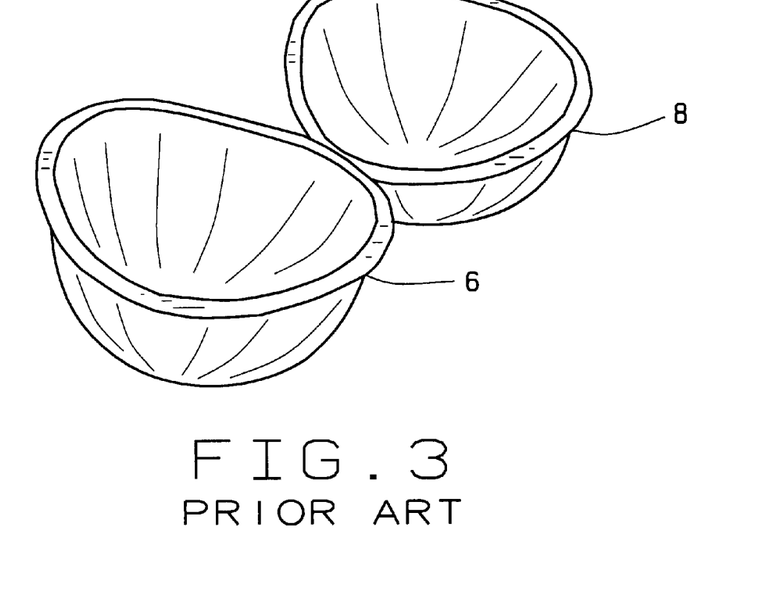
Figure 4:
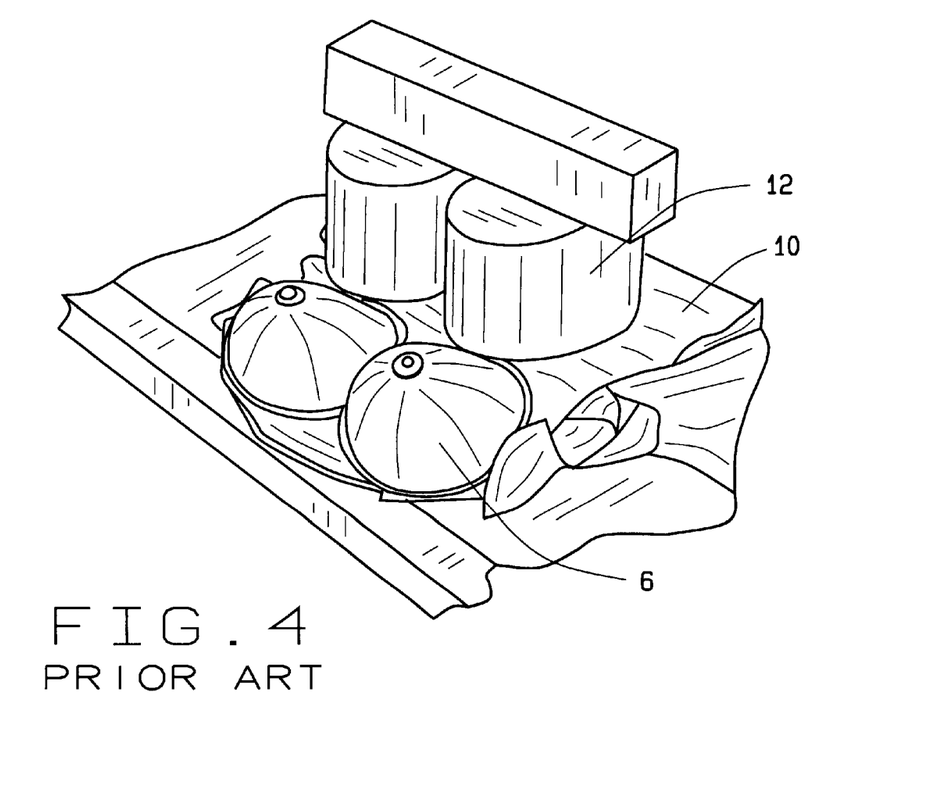
Figure 5:
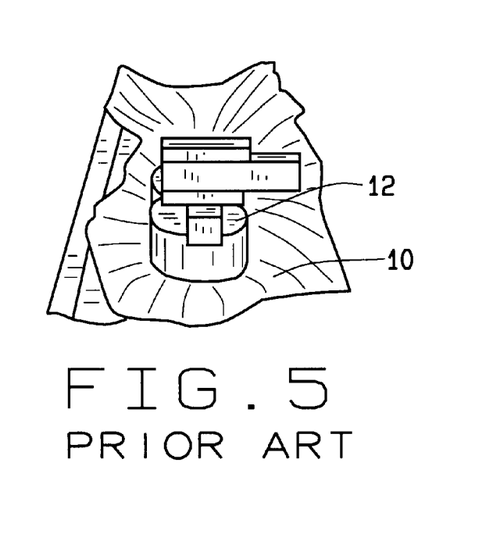

Conventionally, these products are formed of flat sheets of PVC or other flexible polymer, joined at seams to form an airtight enclosure having a valve for inflating and deflating the product with air or any other appropriate fluid. For example, two flat sheets of PVC, usually in the range of 0.18 mm to 0.35 mm in thickness (7 to 14 gauge), are cut to the size required for the particular application. As shown in FIG. 1, these sheets 4 are placed under a conventional horizontally-mounted high frequency (HF) welding machine 2, one sheet over the other. A cutting die in the required shape is placed over the top sheet and the welding machine descends and welds the two pieces of PVC sheet together along a seam in the shape of the die.

Figure 6:
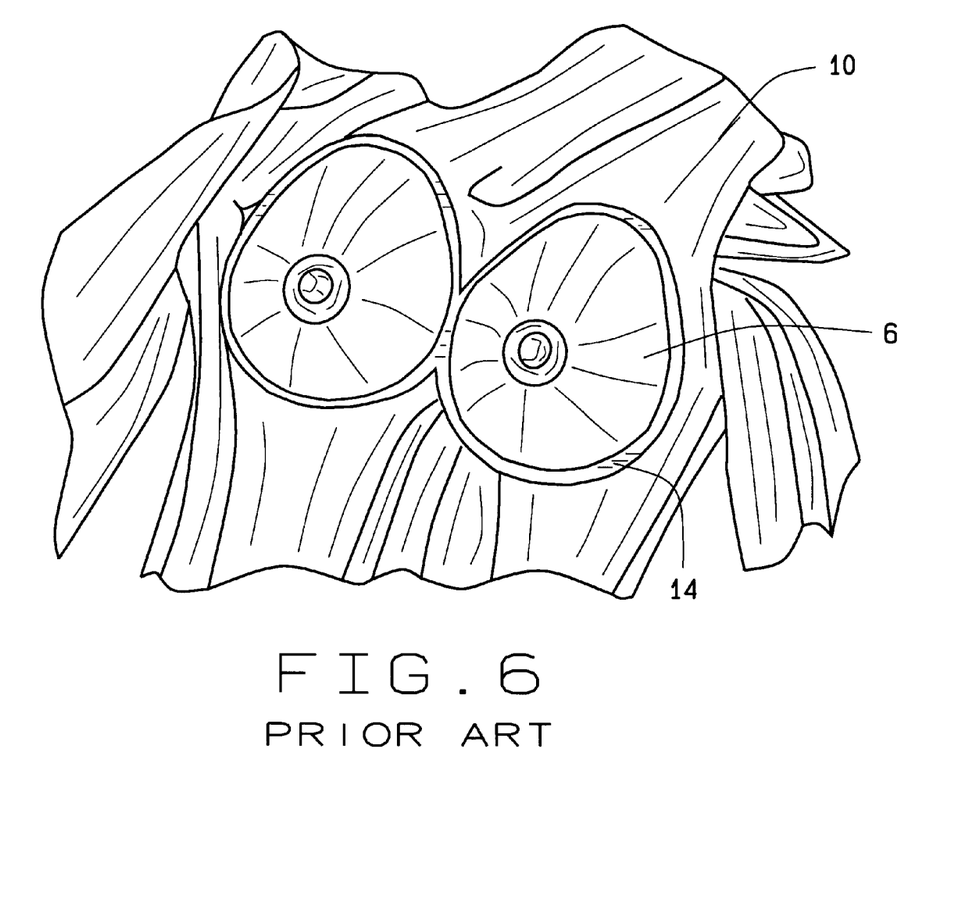
Figure 7:
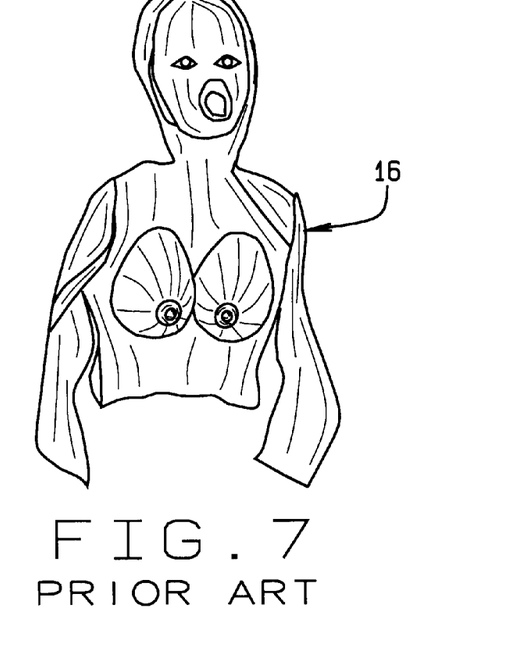

For example, in the case of an inflatable human mannequin, the cutting die may be in the shape of a torso or hand. According to the conventional method, the resulting PVC torso or hand is a two-dimensional form made from the two flat PVC sheets, and will only acquire a three-dimensional appearance when inflated; the two sheets lie flat when not inflated. For a female mannequin, a pair of hollow breast pieces are also usually made from PVC, either molded in an injection molding process or a slush/rotational molding process, or formed as a simple structure by joining several pieces of PVC sheet into cone shapes to resemble breasts. FIGS. 2–7 show a typical process. The breast pieces 6 are hollow, and have concave interiors 8. The breast pieces 6 are put into place on the previously-formed torso piece 10. The breast pieces 6 are then welded onto the torso portion 10 at the peripheries, also by using a conventional vertically-mounted HF welding machine 12. As shown in FIG. 6, a distinct joining line or seam 14 is apparent at the rim of the breast pieces 6 where they join the torso portion 10. As a result, the finished mannequin 16 is not a realistic replica of a female human body.

Because the objective is to create an inflatable mannequin that is life-like in appearance, such joining lines and seams at the breast pieces and at other prominent locations are a drawback in that they detract from the realistic qualities of the doll. Generally, such seams are present in all inflatable PVC products formed according to the described conventional fabrication process, and will diminish the aesthetic quality of any inflatable product that is intended to have a smooth surface or that is meant to resemble an existing object or creature.

A further drawback to the conventional process is that contours of the inflated product are limited, because flat sheets of PVC are used to form the different portions of the finished assembly. When the finished product is inflated, these sheets expand and form smooth three-dimensional surfaces. It is not possible, according to the conventional process, to include irregular contours in these smooth surfaces. In the case of a human mannequin, this absence of variation in contour results in a mannequin that is not life-like, because it lacks such features as a collarbone, ribs, and a navel, as well as details of the hands, such as knuckles. Lacking these features, as well as natural body curves and contours present in real people, the mannequin has an unnatural appearance. A realistic appearance is important to owners of such mannequins, and this unnatural appearance is understandably a disappointment to them.

SUMMARY OF THE INVENTION

It is therefore an objective of the present invention to provide a process of fabricating an inflatable vinyl product that minimizes the number of visible seams in the finished product.

It is a further objective of the present invention to provide a process of fabricating an inflatable vinyl product that results in a finished product having visible seams in only unimportant areas of the finished product.

It is another objective of the present invention to provide a process of fabricating an inflatable vinyl product that creates contours in the otherwise smooth surfaces of the finished product.

It is an additional objective of the present invention to provide a process of fabricating an inflatable human mannequin that includes natural body contours and protrusions.

It is also an objective of the present invention to provide a welding machine that enables accurate manual alignment of PVC sheets used to form a more realistic human mannequin.

The present invention is a process of fabricating an inflatable item. According to a first aspect of the present invention, the process includes providing first and second three-dimensional molds and placing first and second flexible polymer sheets over respective ones of the first and second molds. The polymer sheets are heated until the sheets conformally coat the respective molds. The heated polymer sheets are cooled such that the sheets retain the three-dimensional shapes of the respective molds. Peripheral edges of the first polymer sheet and the second polymer sheet are welded to each other to form a sealed flexible shell having an interior space that can be filled with fluid to inflate the shell such that the shell forms a three-dimensional shape. The first and second molds, when placed so as to abut each other, preferably form the three-dimensional shape of the shell when the shell is inflated. The flexible polymer sheets may be made of vinyl. Heating the polymer sheets until the sheets conformally coat the respective molds may include spreading the polymer evenly over the surface of the respective mold. In a preferred embodiment, welding peripheral edges of the first polymer sheet and the second polymer sheet to each other includes placing the cooled polymer sheets on respective plates of a high frequency welding machine, and moving the plates toward each other until the peripheral edges of the cooled polymer sheets touch each other. The plates may be disposed in a substantially vertical plane. The plates of the welding machine may be disposed on horizontal shafts, and moving the plates toward each other includes moving the shafts such that the plates move horizontally toward each other. The three-dimensional shape of the shell may be the shape of a human body, and particularly a human female body. Alternatively, the three-dimensional shape of the shell may be the shape of a human torso, and particularly a human female torso. In this case, the first three-dimensional mold includes three-dimensional features of a front of a human female torso, including breasts, a navel, and a collarbone. Further, the second three-dimensional mold includes three-dimensional features of a back of a human female torso, including shoulder blades, a lumbar curve, and buttocks. Preferably, a valve is added to the flexible shell, through which a fluid can be provided to the interior space from outside of the shell in order to inflate the shell.

According to another aspect of the present invention, the process of fabricating an inflatable item includes providing first and second three-dimensional molds, wherein the molds, when placed together, form the shape of a human torso. First and second flexible polymer sheets are placed over respective ones of the first and second molds. The polymer sheets are heated until the polymer of the sheets flows to conformally coat the respective molds. The heated polymer sheets are cooled until the polymer no longer flows, such that the sheets retain the three-dimensional shapes of the respective molds. Peripheral edges of the first polymer sheet and the second polymer sheet are welded to each other to form a sealed flexible shell having an interior space that can be filled with fluid to inflate the shell such that the shell forms a three-dimensional shape of a human torso. Preferably, the sealed flexible shell only has welding seams along side surfaces of the human torso shape. In a preferred embodiment, the human torso shape of the sealed flexible shell includes three-dimensional features including breasts, a navel, a collarbone, shoulder blades, a lumbar curve, and buttocks, which may approximate corresponding features of an actual person. The flexible polymer sheets may be made from PVC. In a preferred embodiment, welding peripheral edges of the first polymer sheet and the second polymer sheet to each other includes placing the cooled polymer sheets on respective plates of a high frequency welding machine, and moving the plates toward each other until the peripheral edges of the cooled polymer sheets touch each other. The plates may be disposed in a substantially vertical plane. The plates of the welding machine may be disposed on horizontal shafts, and wherein moving the plates toward each other includes moving the shafts such that the plates move horizontally toward each other. Preferably, a valve may be added to the flexible shell, through which a fluid can be provided to the interior space from outside of the shell in order to inflate the shell.

BRIEF DESCRIPTION OF THE DRAWINGS

These and other objectives and advantages of the present invention will be apparent from the following detailed description, with reference to the drawings, in which.

DETAILED DESCRIPTION OF THE INVENTION

In the following description of the present invention, the exemplary embodiment of an inflatable female human mannequin will be described for convenience only. The inventive process is not limited to formation of a human mannequin, however, and is applicable to all inflatable products made of flexible polymers such as PVC or other vinyl material.

Figure 8:
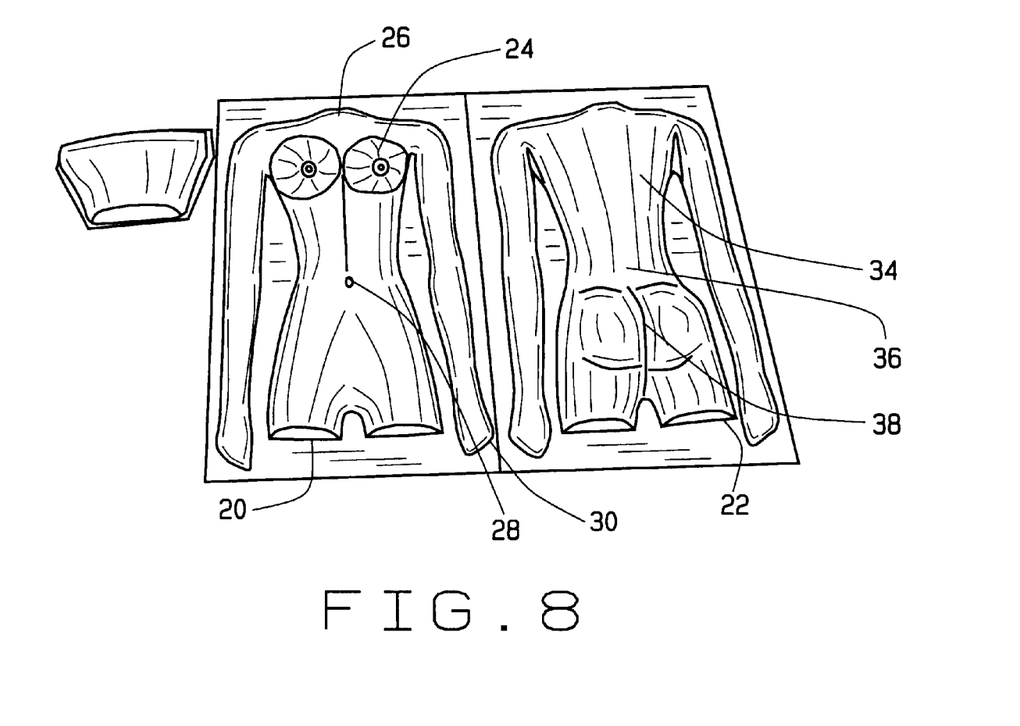
FIG. 8 shows the molds used in the inventive process of forming three-dimensional PVC sheets.

Referring to FIGS. 8–16, the inventive process of fabricating the inflatable mannequin is described. A three-dimensional mold, preferably made of cast metal, of a woman's hands and torso from the shoulder to the thigh is split in half, preferably in two lengthwise halves 20, 22, as shown in FIG. 8. The first half 20 is a mold of the front of the body, and the second half 22 is a mold of the back of the body. Because the mold is made in the shape of a woman's body, each mold half includes the respective natural body curves, contours, and details of that body. Thus, such natural features as the breasts 24, collarbone 26, navel 28, knuckles 30, upper back details such as shoulder blades 34, lower back lumbar curve 36, and buttocks lines and dimples 38 are present in the appropriate halves of the mold.

Figure 9:
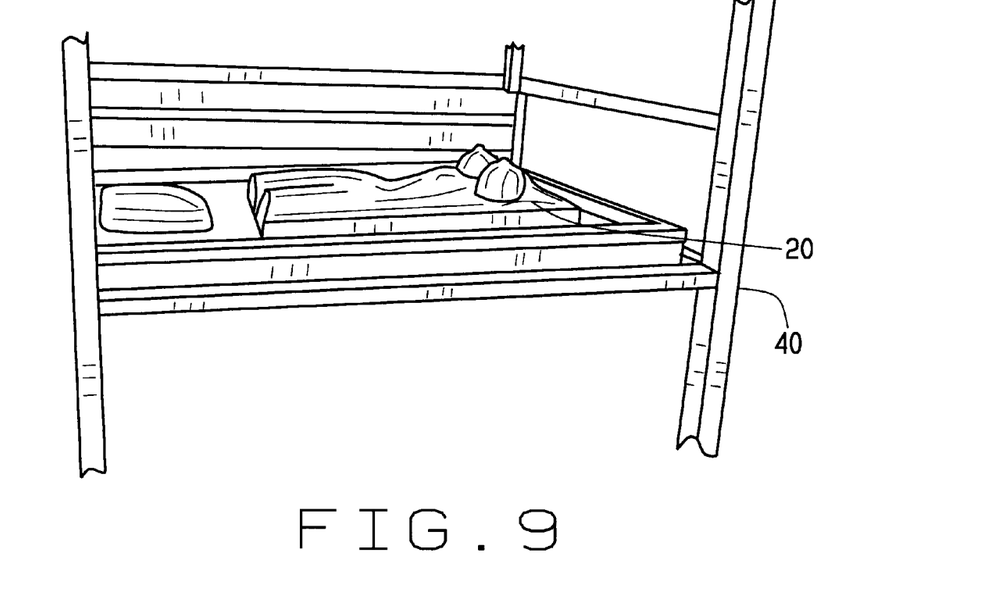
FIGS. 9–12 show the process of forming the three-dimensional PVC sheets from two-dimensional PVC sheets.
Figure 10:
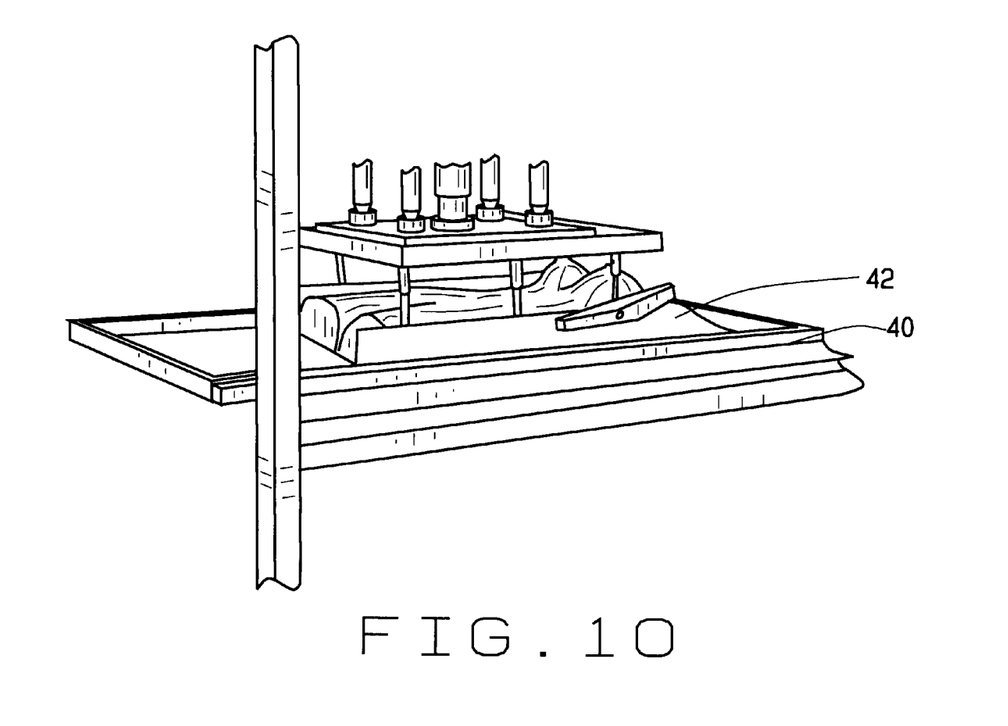
Figure 11:
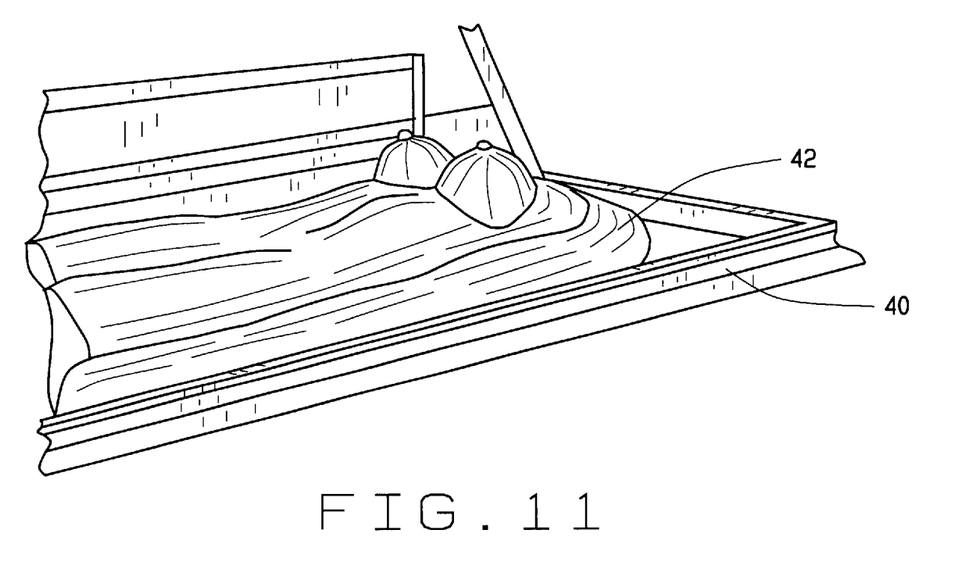
Figure 12:
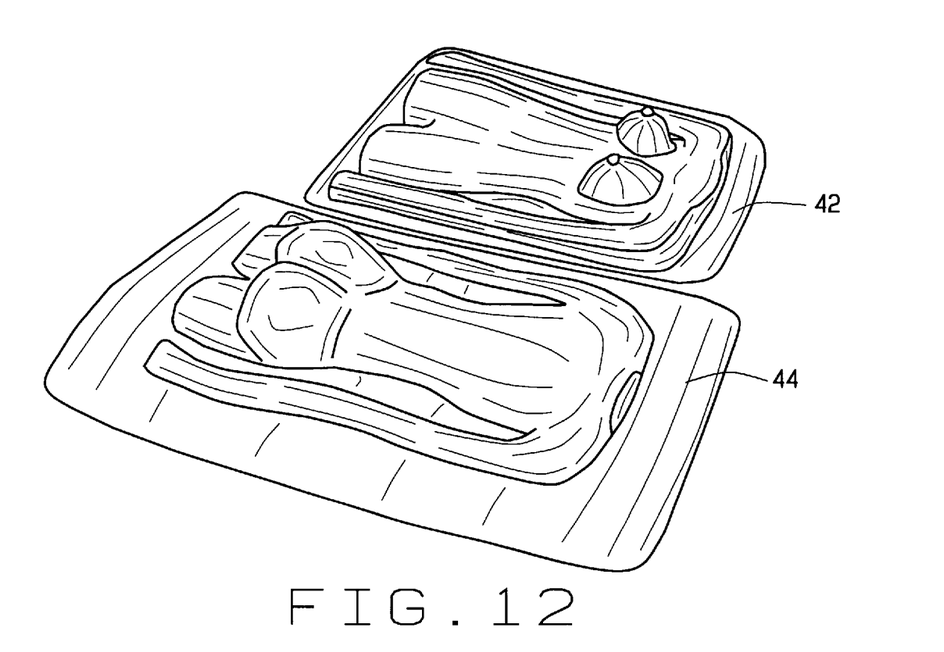
Figure 13:
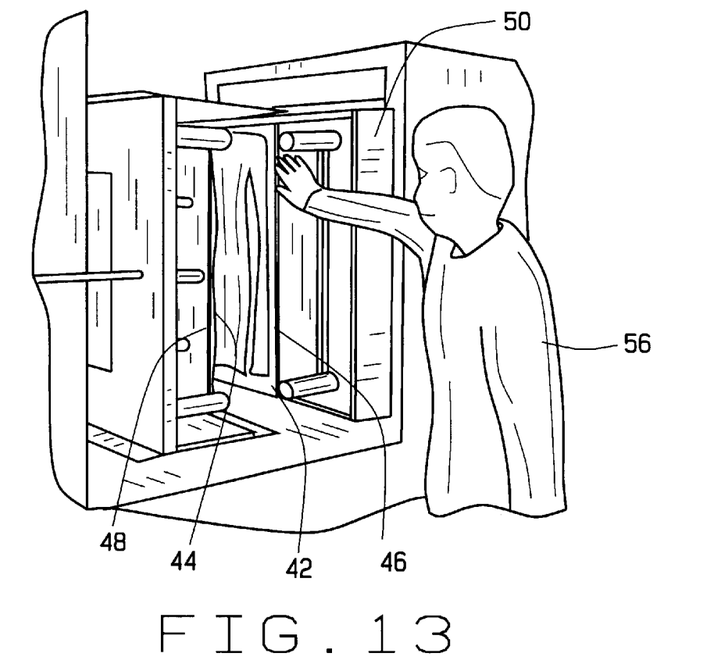
FIGS. 13 and 14 show the process of joining the three-dimensional PVC sheets to form a complete torso, using a welding machine having a horizontal shaft.
Figure 14:
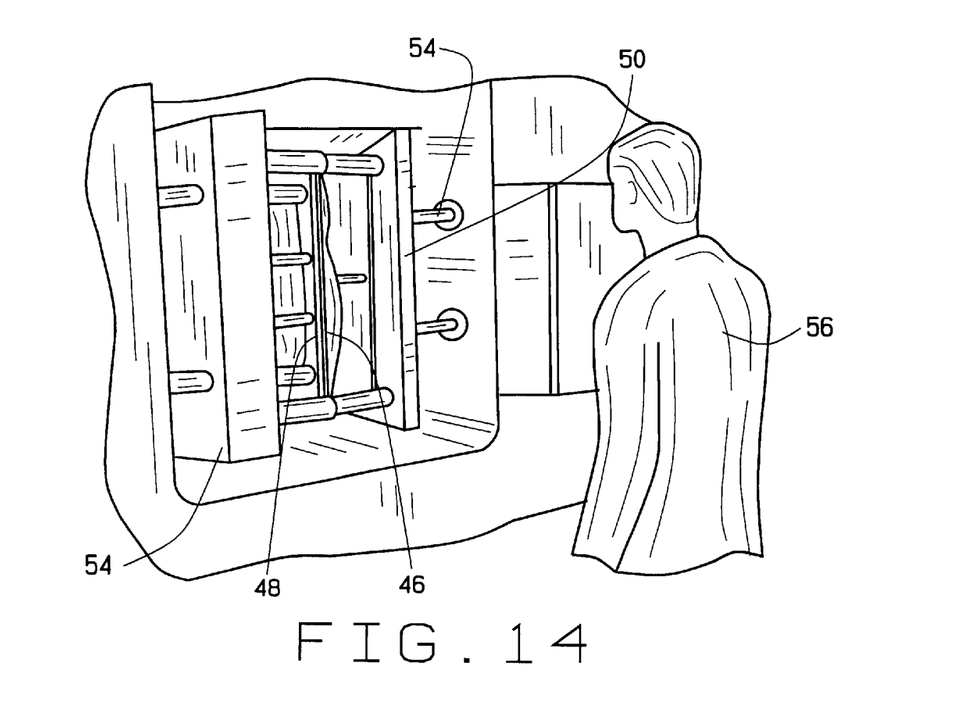

The mold halves 20, 22 are placed in turn onto a heat/compressed air vacuum machine 40, as shown in FIG. 9. As shown in FIG. 10, a sheet of PVC or other flexible polymer 42 is placed over the mold half 20, heated, and then drawn to spread evenly over the three-dimensional mold half 20. Accordingly, the PVC sheet 42 conformally coats the mold half 20 and adopts the shape of the mold half, including the contours and features described above, as shown more clearly in FIG. 11. The PVC sheet is then cooled, at least to an extent that the PVC will no longer flow. The cooled sheet retains the three-dimensional shape of the surface of the mold half on which it was formed, even after being separated from the mold 20, as shown in FIG. 12. A first three-dimensional PVC sheet 42 is formed on the first mold half, and includes the shape of the front of the torso and the front of the arms and hands. A second three-dimensional PVC sheet 44 is formed on the second mold half, and includes the shape of the back of the torso, including the back features and buttocks, and the back of the arms and hands. As shown in FIGS. 13 and 14, the two three-dimensional PVC sheets 42, 44 are then each placed on a respective plate 46, 48 of an HF welding machine 50, and are welded together at the peripheral edges to form a sealed flexible shell in the shape of the original mold. Excess PVC material around the torso shape may have to be trimmed from the welded shell. This may be accomplished automatically by a cutting die incorporated into the welding machine 50, or may be performed after the shell is removed from the welding machine 50.

Figure 15:
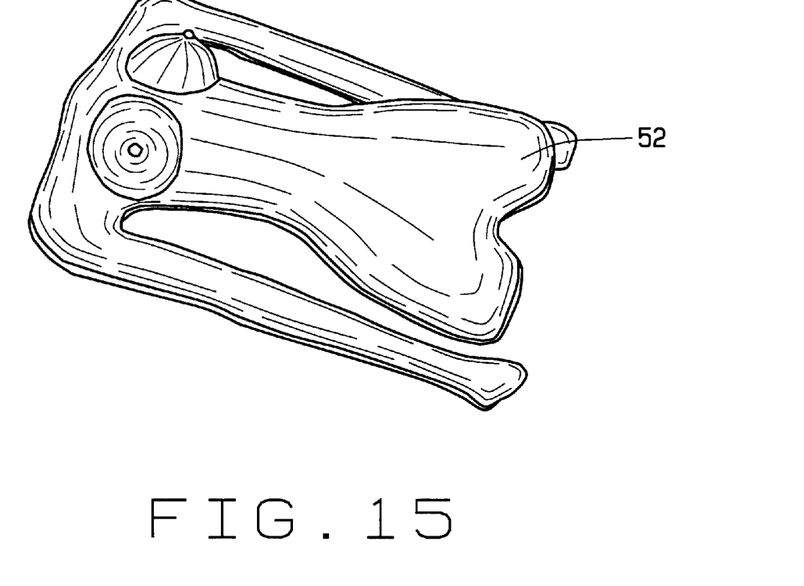
FIG. 15 shows a completed, inflated shell modeled after a human female torso.

The resulting human mannequin is more realistic than that formed by a conventional process. The torso 52 of the mannequin has only a seam running along the side edges of the torso; the three-dimensional contours of the front and back sides are natural and realistic, more closely approximating the look and feel of a real woman, as shown in FIG. 15. The seam of the finished, inflated mannequin runs down the sides and is not prominent when the mannequin is viewed directly from the front or back. Prominent extended surfaces of the breasts, stomach, back, and buttocks are formed smoothly, with no seams. Further, because the three-dimensional PVC sheets used to form the mannequin are made from molds that can be based on an actual woman, a mannequin can be fabricated according to the present invention that is a life-like facsimile of a particular living subject. Thus, an inflatable replica of a loved one or a celebrity can be fabricated according to the inventive process.

In order to produce a mannequin having a realistic three-dimensional shape, the two PVC sheets must be aligned correctly and accurately along the mating edges. Preferably, this alignment is performed manually by the operator, who judges the alignment by sight, prior to welding. Of course, this alignment may be automated, using any known manufacturing techniques.

To weld the first and second PVC sheets together, use of a conventional horizontally-mounted HF welding machine is possible, but not practical. Because the upper plate of the die of a conventional welding machine is mounted on a horizontal plate having a large area and connected to a vertical shaft, the vision of the machine operator who tries to align the two dies is obstructed. In order to overcome this problem, it is preferable to use a welding machine that has a horizontal shaft 54, and is situated such that the two plates 46, 48 travel horizontally. According to this arrangement, the edges of the two three-dimensional PVC sheets will always be in vertical plane within the full vision of the operator 56, as shown in FIGS. 13 and 14.

Figure 16:
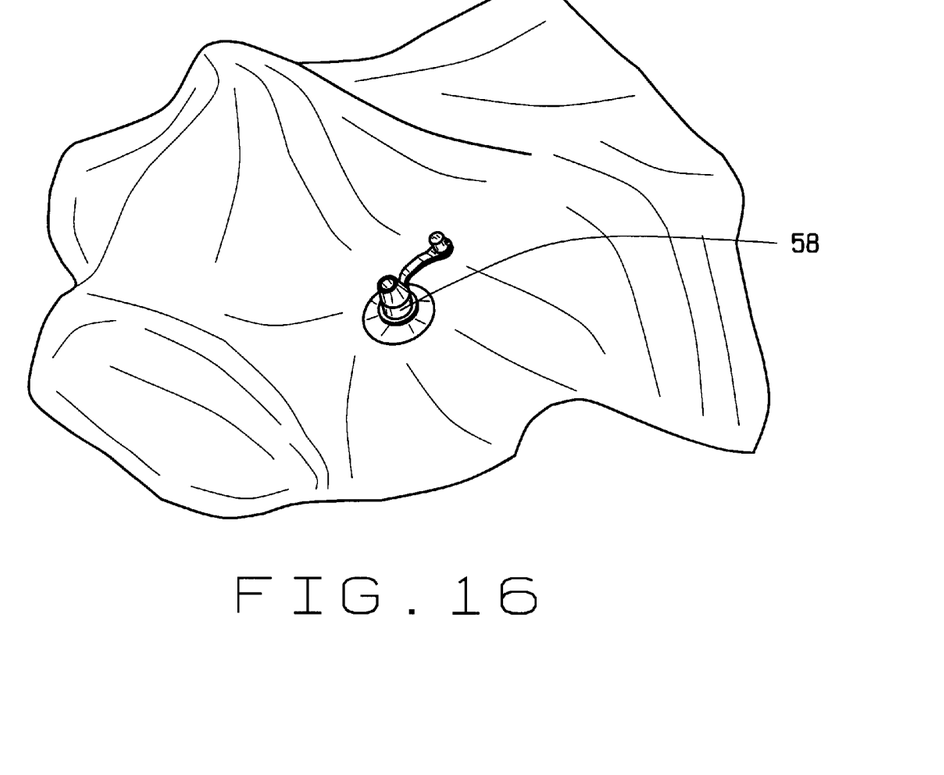
FIG. 16 shows a valve added to the torso.

Any inflatable item formed of a sealed, flexible shell requires an opening through which air or any other fluid can be provided to the interior space of the shell 52 in order to inflate the shell. Preferably, a valve 58 is added to the shell at some point in the manufacturing process, through which such fluid may be provided.

The foregoing description is directed particularly to the torso, arms, and hands of the human mannequin. Of course, other portions of the mannequin, such as the head and legs, can be formed conventionally and attached to the torso. Alternatively, these parts may be formed according to the inventive process, either integrally with the torso portion, or separately and attached in a manner similar to that described above. Further, as understood by those of skill in the art, the inflatable human mannequin is not complete until other items such as artificial hair and external ornamental features and coloration have been added.

Preferred and alternative embodiments have been described in detail. It must be understood, however, that the invention is not limited to the particular embodiments described herein. Rather, the invention is defined by the following claims, which should be given the broadest interpretation in view of the written description and any relevant prior art.

What is claimed is:

1. A process of fabricating an inflatable item, comprising:

providing first and second three-dimensional molds, wherein the molds, when placed together, form the shape of a human torso;

placing first and second flexible polymer sheets over respective ones of the first and second molds;

heating the polymer sheets until the polymer of the sheets flows to conformally coat the respective molds;

cooling the heated polymer sheets until the polymer no longer flows, such that the sheets retain the three-dimensional shapes of the respective molds; and welding peripheral edges of the first polymer sheet and the second polymer to each other to form a sealed flexible shell having an interior space that can be filled with fluid to inflate the shell such that the shell forms a three-dimensional shape of a human torso, wherein welding peripheral edges of the first polymer sheet and the second polymer sheet to each other includes placing and aligning the cooled polymer sheets on respective plates disposed in a substantially vertical plane of a high frequency welding machine, and moving the plates horizontally toward each other until the aligned peripheral edges of the cooled polymer sheets touch each other.

2. The process of claim 1, wherein the sealed flexible shell only has welding seams along side surface of the human torso shape.

3. The process of claim 1, wherein the human torso shape of the sealed flexible shell includes three-dimensional features including at least one of breasts, a navel, a collarbone, shoulder blades, a lumbar curve, and buttocks.

4. The process of claim 1, wherein the flexible polymer sheets are made from polyvinly chloride.

5. The process of claim 1, wherein the human torso shape of the sealed flexible shell includes three-dimensional feature approximating corresponding features of an actual person.

6. The process of claim 1, further comprising adding a valve to the flexible shell, through which a fluid can be provided to the interior space from outside of the shell in order to inflate the shell.

7. The process of claim 1, wherein the plates of the welding machine are disposed on horizontal shafts, and wherein moving the plates toward each other includes moving the shafts such that the plates move horizontally toward each other.

\* \* \* \* \*

UNITED STATES PATENT AND TRADEMARK OFFICE
CERTIFICATE OF CORRECTION

PATENT NO. : 6,558,498 B1  
DATED : May 6, 2003  
INVENTOR(S) : Nan Siu Man

It is certified that error appears in the above-identified patent and that said Letters Patent is hereby corrected as shown below:

<u>Title page,</u>  
Item [75], Inventor should read -- Nan Siu Man. --

Signed and Sealed this

Sixth Day of April, 2004

JON W. DUDAS  
*Acting Director of the United States Patent and Trademark Office*